J. L. PIPER.

Tree-Protector.

No. 53,672. Patented Apr. 3, 1866.

Witnesses
F. P. Hale Jr.
G. W. Washburn

Inventor
Joseph L. Piper
by his atty
R. H. Eddy

UNITED STATES PATENT OFFICE.

JOSEPH L. PIPER, OF WINTHROP, MASSACHUSETTS.

IMPROVEMENT IN TREE-PROTECTORS.

Specification forming part of Letters Patent No. 53,672, dated April 3, 1866; antedated March 30, 1866.

*To all whom it may concern:*

Be it known that I, JOSEPH L. PIPER, of Winthrop, in the county of Suffolk and State of Massachusetts, have invented an Improved Tree-Protector; and I do hereby declare the same to be fully described in the following specification and represented in the accompanying drawings, of which—

Figure 3:
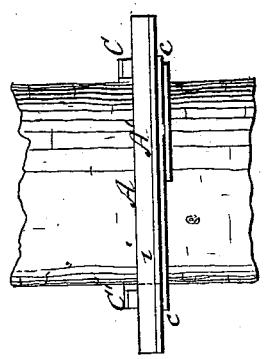
Figure 4:
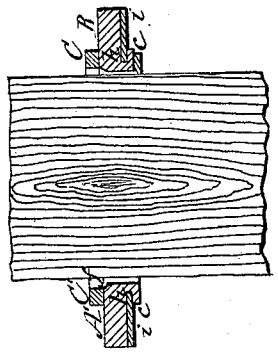
Figure 1:
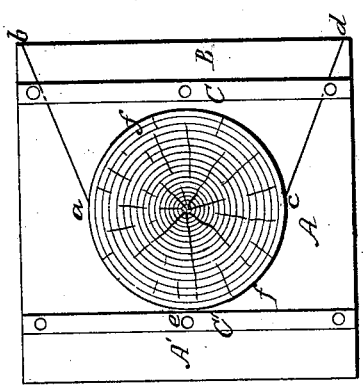
Figure 2:
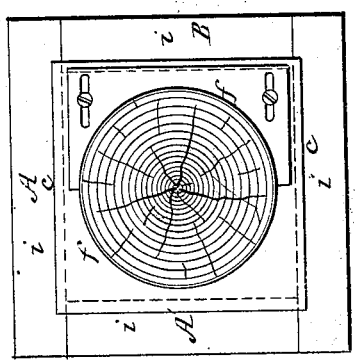

Figure 1 is a top view, Fig. 2 a bottom view, Fig. 3 an end elevation, and Fig. 4 a transverse section, of it.

In the said drawings, A denotes a platform, composed not only of a board, A', provided with a flaring opening, $a\,b\,c\,d\,e$, leading through one edge of it, and formed as shown in Figs. 1 and 2, but of another board, B, to partially fill such opening, the said board B being so hollowed out or shaped as to form with the opening of the board A' a circular passage, $f$, leading through the two boards A' and B. A cleat, C, screwed to the upper sides of the boards A' B, connects them together where they encompass the trunk of a tree. Another cleat, C', may be screwed to the board A', to prevent it from becoming warped or crooked under ordinary atmospheric influences. The two boards A' B are rabbeted on their lower surfaces and along their outer edges, the rabbet $c$ having a saw-kerf or groove, $h$, extending from it into the platform in manner as shown in Fig. 4. The said rabbet and its saw-kerf, extending entirely around the edges of the platform, are to have strips of glass plate $i\,i\,i\,i$ placed in them or arranged in manner as shown in the drawings.

From the above it will be seen that there is a portion of the platform which projects below the glass plates.

When the platform is arranged around the trunk of a tree, which it is to be when the protector is in use, it should have the spaces between the bark of the tree and the periphery of the hole $f$ stuffed or filled with a suitable packing, which will prevent the grubs or worms from passing between the tree and the platform. After ascending the tree and crawling against the lower surface of the wooden portion of the tree-protector, the worm or grub will arrive at the glass banding encompassing the same, which will prove to him a barrier over which he cannot travel, as his feet, owing to their peculiar formation, will not adhere to it sufficiently for him to crawl across it. Consequently he will be effectually estopped from further ascent of the tree.

I am aware that a concave annulus of glass has been used about a tree and suspended therefrom by a canvas or cloth tent, the same being to prevent ascent of the tree by insects. Therefore I do not claim the application of glass for such purpose; nor do I claim the channeled ring of glass made for such use.

My invention enables me to use strips of common window-glass or plate-glass, such as are commonly known as the "waste" of glass-cutters, and in this way to utilize such to advantage.

Furthermore, by the employment of the boards made in the manner as described and to go around a tree, and to have the glass applied to them as set forth, I not only make a very desirable tree-protector, but one whose surfaces can be easily cleaned and are well protected from rain and dust.

I therefore claim as my invention—

1. The said improved tree-protector, as made of the platform to be applied to the trunk of a tree, and with the strips of glass arranged in such platform, substantially in manner as hereinbefore set forth.

2. The platform as made with the rabbet and the saw-kerf or recess arranged on and around it, substantially in manner and for holding the plates of glass as specified.

JOSEPH L. PIPER.

Witnesses:
R. H. EDDY,
F. P. HALE, Jr.